(12) United States Patent
Shah et al.

(10) Patent No.: US 9,535,976 B2
(45) Date of Patent: Jan. 3, 2017

(54) INFORMATION EXCHANGE ENGINE PROVIDING A CRITICAL INFRASTRUCTURE LAYER AND METHODS OF USE THEREOF

(71) Applicants: Ajit S. Shah, Portola Valley, CA (US); Madhukar Thakur, San Jose, CA (US); David Hu, Sunnyvale, CA (US); Joyce Thom, San Leandro, CA (US)

(72) Inventors: Ajit S. Shah, Portola Valley, CA (US); Madhukar Thakur, San Jose, CA (US); David Hu, Sunnyvale, CA (US); Joyce Thom, San Leandro, CA (US)

( * ) Notice: Subject to any disclaimer, the term of this patent is extended or adjusted under 35 U.S.C. 154(b) by 0 days.

(21) Appl. No.: 14/987,716

(22) Filed: Jan. 4, 2016

(65) Prior Publication Data

US 2016/0196333 A1    Jul. 7, 2016

Related U.S. Application Data (63) Continuation of application No. 14/461,346, filed on Aug. 15, 2014, now Pat. No. 9,229,962, which is a continuation of application No. 13/327,719, filed on Dec. 15, 2011, now Pat. No. 8,812,548, which is a continuation-in-part of application No. 12/848,166, filed on Jul. 31, 2010, now Pat. No. 8,099,435, which is a continuation-in-part of application No. 09/742,699, filed on Dec. 20, 2000, now Pat. No. 7,788,222.

(60) Provisional application No. 60/172,977, filed on Dec. 20, 1999.

(51) Int. Cl.
*G06F 17/30* (2006.01)
*G06Q 10/10* (2012.01)
*H04L 29/06* (2006.01)
*H04L 29/08* (2006.01)

(52) U.S. Cl.
CPC ......... *G06F 17/30604* (2013.01); *G06F 17/30* (2013.01); *G06F 17/30289* (2013.01); *G06F 17/30569* (2013.01); *G06F 17/30595* (2013.01); *G06F 17/30598* (2013.01); *G06Q 10/10* (2013.01); *H04L 29/06* (2013.01); *H04L 63/0428* (2013.01); *H04L 67/02* (2013.01); *H04L 67/04* (2013.01); *H04L 67/10* (2013.01); *H04L 67/26* (2013.01); *H04L 67/2842* (2013.01); *H04L 69/329* (2013.01)

(58) Field of Classification Search
CPC ............... G06F 17/30; G06F 17/30289; G06F 17/30569; G06F 17/30604; G06F 17/30595; G06F 17/30598
USPC .................................................. 707/600–899
See application file for complete search history.

(56) References Cited

U.S. PATENT DOCUMENTS

| | | | | |
|---|---|---|---|---|
| 5,675,782 A | * | 10/1997 | Montague | G06F 21/604 |
| | | | | 707/999.01 |
| 6,535,917 B1 | * | 3/2003 | Zamanzadeh | G06F 21/34 |
| | | | | 707/999.009 |

* cited by examiner

*Primary Examiner* — Isaac M Woo
(74) *Attorney, Agent, or Firm* — Kang S. Lim (57) ABSTRACT

A virtual record manager and a data exchange engine are provided for dynamically defining data records in a database and for dynamically allocating instances of defined data records. These components are capable of mediating between the database and application and client interface layers to facilitate exchange of information over a network. Embodiments are configured to allow complex data records having a plurality of related fields, and to allow management and exchange of information at both the data field level and data record level.

13 Claims, 1 Drawing Sheet

INFORMATION EXCHANGE ENGINE PROVIDING A CRITICAL INFRASTRUCTURE LAYER AND METHODS OF USE THEREOF

CROSS REFERENCE TO RELATED APPLICATIONS

This application is a Continuation of and claims priority to U.S. patent application Ser. No. 14/461,346, filed Aug. 15, 2014, of same title, which will issue on Jan. 5, 2016 as U.S. Pat. No. 9,229,962, which is a Continuation and claims priority to U.S. patent application Ser. No. 13/327,719, filed Dec. 15, 2011, of same title, now U.S. Pat. No. 8,812,548, which is a Continuation-in-Part and claims priority to U.S. patent application Ser. No. 12/848,166, filed Jul. 31, 2010, of same title, now U.S. Pat. No. 8,099,435, which is a Continuation-in-Part of and claims priority to U.S. patent application Ser. No. 09/742,699, filed on Dec. 20, 2000, of same title, now U.S. Pat. No. 7,788,222, which application claims priority from U.S. Provisional Patent Application No. 60/172,977, filed on Dec. 20, 1999, entitled "Web-Based Personal Data Repository and Access Management System and Methods of Use Thereof," which all applications are incorporated herein in their entirety by this reference.

BACKGROUND

Field of the Invention

The present invention relates generally to information technology, and more particularly to systems and methods for providing dynamic creation, storage and exchange of personal information.

Description of Related Art

With the evolution of social interaction, people feel the need to exchange personal and business information with each other. In addition, with the advancement and proliferation of communication technology, people have acquired more and more personal contact information, such as electronic mail addresses, mobile phone numbers, and the like. These issues, coupled with the dynamic nature of society, has created a need for an easier, more accurate way to store personal information, to maintain its accuracy and currentness, and to exchange it with others.

With the advancement and proliferation of computer network technology, people and businesses have increasingly relied on computers, computer networks, handheld electronic devices, and the like to manage their vast amount of personal and business information. Thus, there is a further need for convergence of a robust data management system with network communication technologies to fill the need for a flexible, easily updateable, real-time information exchange mechanism.

SUMMARY

An information exchange system which provides a critical infrastructure layer, and methods of user thereof, are described. The information exchange system provides a tool for dynamically defining data records and dynamically allocating instances of those records. The system further provides a tool for facilitating electronic exchange of personal information represented by the data, such as contact, payment, shipping, and other information, between individuals and the people and businesses with which they interact. The system allows editing and sharing of information at a data field level, in addition to supporting information transactions at a complex level, defined as a combination of related fields. The architecture of one embodiment is such that the system can be coupled with a conventional relational database application.

The information exchange system comprises an interface layer providing a tool for users to interact with the system through a plurality of client-side platforms. The system also comprises an application layer comprising a vault providing a storage mechanism for individual and business users to store information about themselves and/or their business, and a contact manager providing a utility for saving information about static and dynamic contacts.

The system further comprises a critical exchange engine layer comprising an account manager, a virtual record manager, a data exchange engine, and an encryption engine which provides the capability to save and access raw data that has been encrypted in a relational database. The virtual record manager is configured to manage the storage of data, whereby support for complex data records is supported while maintaining access and control of data on an individual field basis. The data exchange engine supports the exchange of information between system users and the definition and enforcement of rule-based behaviors on the availability of information.

A database is provided in one embodiment for storage of encrypted personal information of system users, for storage of metadata describing the structure and description of the personal information stored in the database, and for storage of permissions data describing sharing and accessibility rules related to the fields of information.

The system generally provides a private, accurate, convenient, and secure method of maintaining and accessing up-to-date information at any time from anywhere. Users are able to expand and customize their information readily and in real-time. The information in the robust data repository can be accessed through a WAN such as the Internet or through various handheld wireless devices. Upon a change of information, all persons that have permission to view that information field are alerted and updated automatically with the new data.

Although uses of the information exchange system described herein are many, several are provided for exemplary purposes. Exemplary uses for an individual user which are provided by the system include: (1) requesting a summary of information that has changed for people, groups, or businesses in their network of contacts, possibly through a personal newsletter or as highlighted boxes on a system home page, thus being automatically informed of changes; (2) maintaining a community address book whereby clubs, organizations, chat groups, etc. can maintain current information on members which can be reflected in distribution lists or instant messaging buddy lists linked to the system; (3) drawing on information already stored in the system to save time filling out on-line registration, commerce, and site log-in forms preferably by supplying a system ID to the site of interest which is linked to personal, commerce, and site specific user name/password information of the user; and (4) automatically notify friends, relatives, and businesses when a user moves, providing the new personal information immediately.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF PREFERRED EMBODIMENTS

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

Figure 1:
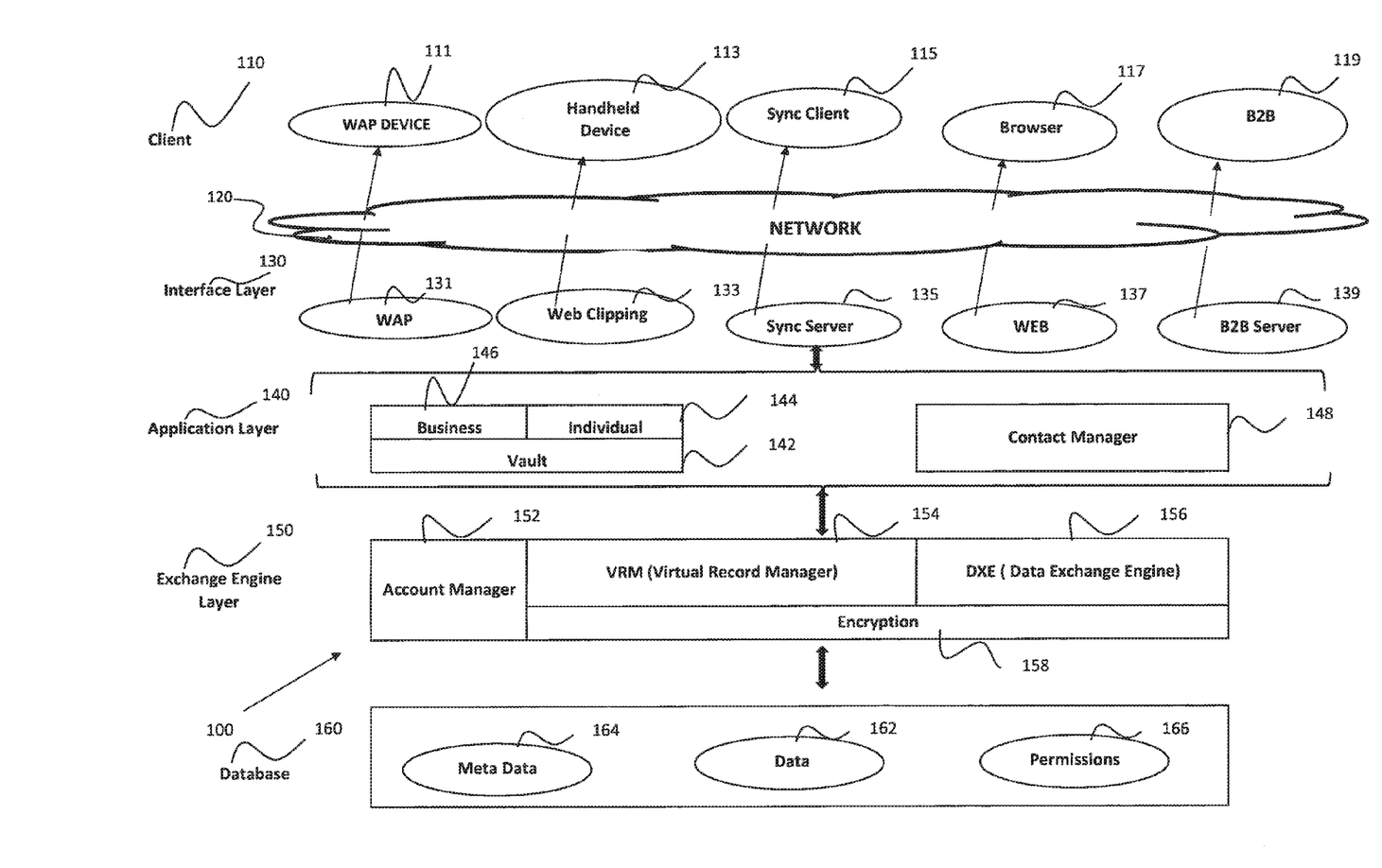
FIG. 1 depicts a preferred operating architecture of an information exchange system, according to an embodiment of the invention.

FIG. 1 depicts a preferred operating architecture 100 of the information exchange system 102 described herein. The overall system architecture 100 is based on a network client-server model, wherein various client 110 platforms communicate with a layer of applications 140 through a network 120. Since the information exchange system 102 supports a plurality of client platforms (which are discussed in detail below), an interface layer 130 comprising interface servers is provided for interacting with the plurality of client-side platforms. The information that is exchanged by users of the system 102 is maintained in a database 160. The critical infrastructure layer that primarily provides the operational capability of the system 102 to facilitate the storage, modification, and exchange of information for people and businesses lies in the exchange engine layer 150.

The application layer 140 and its components are described prior to the detailed description of the interface layer 130, so it is noted that a client user interacts with the system 102 and its application layer 140 through the interface layer 130. The application layer 140 contains a vault 142 and a contact manager 148. The vault is depicted as containing constituent elements for individual 144 and business 146 applications for didactic purposes, but configurations are contemplated wherein the needs of both individual and business users are provided by a single vault 142 application.

The vault 142 is an application that provides a storage mechanism for registered individual and business users of the system 102 to store information about themselves and/or their business. Non-limiting examples of an individual user's information include name, home and office addresses, home, office, mobile phone and various other phone numbers, date of birth, as well as similar information about the user's spouse and children. Additional examples include names and membership numbers related to various organizations of which the user is a member, bank and mortgage information, and similar information. A user's information may be described within the system 102 in relation to various permission groups to facilitate management by the user, e.g., groups such as "family," "work," "financial," "social," "recreational," etc. Non-limiting examples of a business user's information include the business name, address of their headquarters and branch offices, names of the company executives, Dun and Bradstreet number, tax identification number, bank account information, membership in various organizations, etc.

The vault 142 presents the registered user with a number of fields with predefined semantics. To this end, the vault 142 utilizes information stored and managed by the account manager engine 152, to know if the user is a business user or an individual user. For example, the vault 142 may present "name" and "home address" fields to an individual user, whereas it may present "office phone number" and "D&B number" fields to a business user. The number of fields of information and the nature of the fields are decided by each registered user of the system, and are not limited to those presented. Consequently, the exchange system 102 is configured to facilitate the exchange of dynamic, user-defined information and types of information.

The vault 142 invokes the virtual record manager (VRM) 154 of exchange engine layer 150 to actually store and retrieve the information. In managing the information, the vault 142 queries the VRM 154 using an internal account ID of the registered user as a parameter of the query. The VRM 154 provides the name, value, and an internal ID of every field in which the user has stored information. The vault 142 also provides to the user the information stored in each of these fields. Upon user modification of any of the user's information fields, the vault 142 provides to the VRM 154 the fields that have changed and the VRM 154 subsequently stores the modifications in the database 160. Upon user creation of a new field of a particular type, the vault 142 directs the VRM 154 to allocate memory for the new field. The VRM 154 operates to allocate sufficient memory to store the new field and the related information depending on the type of the field created, such as text or numeral, simple or complex, and the like.

The contact manager 148 is an application similar to a conventional address book application, but providing a number of novel features. The contact manager 148 provides to users a utility for saving information about their contacts, i.e., people with whom the users desire to keep communicative contact. The contact manager 148 differentiates between two types of contacts, static and dynamic contacts.

Static contacts are defined as those in which information is provided to the system 102 by a user. For example, an individual user could employ the system to store the name of a friend and an associated home and work phone numbers and home address, whereby this information is not provided to the system directly by friend. If the friend were to change residence (and hence home address and home phone number), the user would need to re-enter these changes into the system 102.

In contrast, dynamic contacts are those in which information is provided to the system 102 directly by the contact person and is shared with others through operation of embodiments of the system 102. For example, if a user desires to have a friend's information in a personal list of contacts managed in the system 102 and if the friend is a registered user of the system 102, the user does not need to provide the friend's information to the system. The friend would directly save personal information in the system 102, utilizing the vault 142 application as previously described. The friend would then permit the system 102 to share portions of personal information, e.g., home and office phone numbers, with the user. The user would consequently find the personal list of contacts to include the friend with the relevant information that the user has is permitted to access and view. If the friend were to modify any portion of the information that is being shared with the user, the user will be able to view the new information when viewing the personal contact list. In addition, the system 102, primarily through operation of a data exchange engine 156 of exchange engine layer 150 and permissions data 166 of database 160, provides the capability for the friend to manage access to personal information by directing the contact manager 148 to share this or any other personal information with the user for a defined period of time only. After expiration of this defined period, the user will no longer be able to view the friend's information.

The contact manager 148 manages the information about each registered user's static contacts by storing these in the database 160 and retrieving it when necessary. In contrast, to manage dynamic contacts the contact manager 148 invokes the VRM 154 and the data exchange engine (DXE) 156. The contact manager 148 first invokes the account manager 152 to verify that the user logging in to the system 102 is a registered user and to retrieve the internal account ID of the user. The contact manager 148 would then communicate with the VRM 154, providing the VRM 154 with the account ID of the registered user. The VRM 154 is operative to retrieve from the database 160 and to present to the user the names and account IDs of the user's dynamic contacts. The contact manager 148 then invokes the DXE 156 to determine which fields of each dynamic contact are being shared with this registered user.

Once the contact manager 148 is familiar with the fields (represented as field IDs) shared by one registered user with another (i.e., shared by the dynamic contact with the logged-in user), it invokes the VRM 154 to read the contents of the shared fields. The system 102 is capable of then providing the content of these fields to the appropriate interface layer server 131-139, for transmission to the associated client platform 111-119.

It is noteworthy that the contact manager 148 provides a rich set of information about a user's contacts, including every piece of information that the contact registered user allows one to see. In addition, the contact manager 148 provides the capability for the user to query the contact manager 148 in order to determine who has actually viewed which personal information fields in their information repository. Furthermore, if a personal information field has been constructed as time-limited, the system 102 will automatically stop sharing this information upon expiration of the associated time limit.

Reference is directed to the exchange engine layer 150, which comprises the account manager 152, the virtual record manager (VRM) 154, the data exchange engine (DXE) 156, and the encryption engine 158. The account manager 152 manages account information about each registered user. This information includes, but is not limited to, whether a user is a business or individual user, their internal account ID and password, the last time they logged into the system 102, whether their registration is still active, etc. The account manager 152 also implements security rules that inactivate a registered user's account upon certain occurrences or non-occurrences. For example, registered users are considered inactive and thus their accounts inactivated if they do not login to the system 102 at least once every six months. Additionally, users may be locked out of the system 102 for a 24-hour period if they unsuccessfully attempt to login four times during any four-month window.

The account manager 152 preferably stores the relevant account information in a table of a relational database. Each row of the table is configured to store information about one registered user. The columns of the table are preferably configured to represent the registered user's password, the last time they logged in to the system 102, whether the user is locked out for a security reason, whether the user has changed the login name and the previous login name, and the like. Those skilled in the art may recognize that the information stored and managed by the account manager may include more than those items listed above and still be within the scope of the present invention.

The virtual record manager (VRM) 154 is configured to manage the storage of data preferably utilizing a conventional relational database. The VRM 154 supports complex data type (record) modeling while maintaining access and control of data on an individual field basis. For example, the VRM 154 architecture supports operations on a single-field record, an entire complex (multi-field) record, or an individual field within a complex record. Furthermore, the VRM 154 is configured to provide a fully dynamic extensible data store mechanism whereby new instances of data records as well as entirely new and possibly unique data types may be defined "on the fly," or substantially instantaneous, for each user, without the need for any system downtime to perform such operations.

The VRM 154 operates at the level of a single field of information. For instance, each field of information is assigned a unique ID so that operations can be performed on individual fields. The fields are also defined for a particular user of the system, although sharing of fields between users is possible by employing the DXE 156. The information fields are also typed, allowing type-specific behavior (input data validation, for example) to be implemented.

To support record-level data modeling, the VRM utilizes the concept of a virtual object (VOB) (not shown). The VOB defines a record structure (logical collection of individual data fields), and also supports the ability to arbitrarily nest record structures. Any number of VOB types can be defined, either globally accessible by all users or per user of the system, and each VOB type is assigned a unique VOB type ID. VOB type information provides the metadata, which is generally a definition or description of the data, for the VRM 156 to dynamically support arbitrary data types and is stored in the VOB and VOB Field of the following database 160 table.

TABLE 1

| Database Table | Description |
| --- | --- |
| VOB | Metadata for Virtual Objects (VOBs) describing elements such as the VOB type name, VOB Type ID, etc. There is one row for each VOB type defined. |
| VOB_Field | Metadata describing the individual fields defined for each VOB. There is one row for each field within a virtual object. |

When a new VOB is defined by a user, the VRM 154 searches for the metadata for the requested VOB type (via it's unique VOB type ID) and creates a record to reflect the VOB instance (in the VOB_Data table), in addition to all of the individual fields defined for the VOB (in the VOB_Field_Data table). This data structure is depicted in the following database 160 table.

TABLE 2

| Database Table | Description |
| --- | --- |
| VOB_Data | Instances of VOB types. There is one record for every VOB that is instantiated. Each VOB is instantiated for a particular user account. |
| VOB_Field_Data | Data for each VOB instance. There is a row for each field defined for an instantiated VOB type. |

The VRM 154 also supports the ability to control the VOB types available to a particular user based on their user class. For example, the VOB types available to business users can be defined to be different than those available for individual users.

In addition to VOBs, the VRM 154 also supports two additional concepts, InfoCards and VRecords. InfoCards provide a convenient way for users to share their information using the DXE 156. An InfoCard allows a user to define a specific collection of information fields. It is noted that InfoCards differ from VOBs in that they can only be defined from a set of already defined fields, and that the fields selected can actually span across VOBs. To ensure a minimum set of data may be exchanged between any two user accounts, the VRM 154 may pre-populate every user account with a minimum set of VOBs, and define a set of system-defined InfoCards that use those VOBs. The operability of the InfoCard feature is provided primarily by the database 160 table depicted.

TABLE 3

| Database Table | Description |
| --- | --- |
| Field_Group | Contains InfoCards. There is a row for each InfoCard defined for a user account. |
| Field_Group_Data | Defines the fields that belong to each InfoCard defined. There is a row for each field that is defined within an InfoCard. |

VRecords provide a generic mechanism for the electronic exchange of information with third-party systems, a valuable feature for business-to-business (B2B) electronic commerce. In many cases, a third party has a data record format that they wish to have returned from the system 102 when requesting information about a particular registered user of the system 102. The VRecord defines a mapping between the third party record format, and the native system 102 record structure as primarily defined by the metadata 164 of database 160. Employment of a VRecords further allows a user to define a mapping based on the user class (e.g. a different mapping can be defined for business and individual users). This VRecords feature operates by correlating a field ID for each class of user with an output field name selected by the VRecord author. The operability of the VRecords feature is provided primarily by the database 160 table depicted.

TABLE 4

| Database Table | Description |
| --- | --- |
| VRecord | Contains VRecords. |
| VRecord_Dynamic_Data | Defines field mapping for obtaining information from system 102 member accounts. |
| VRecord_Static_Data | Defines field mapping for obtaining information for static contacts defined in the system 102 contact manager 148 for the requesting party. Primarily useful for synchronization applications. |

Some of the operational capability of the VRM 154 is exemplified below by describing the effect that occurs in certain tables of database 160 when a transaction is implemented.

Define New Record Type

This example demonstrates the database 160 changes that occur when a new VOB type is defined in the system 102. Assume that a user desires to define a new record named "Friend" that has the following fields:

First Name
Last Name
PhoneNumber

Assuming this is done for user account 250, and that the last VOB_Type_ID used was 200, this operation creates the following row in the VOB table:

TABLE 5

| Account_ID | VOB_Type_ID | VOB_Name | VOB_Description |
| --- | --- | --- | --- |
| 250 | 205 | Friend | Record for adding a friend |

It also creates the following rows in the VOB_Field_ table:

TABLE 6

| Account_ID | VOB_Type_ID | Field_Order | Field_Label | Field_Type_ID |
| --- | --- | --- | --- | --- |
| 250 | 205 | 5 | First Name | 1 |
| 250 | 205 | 10 | Last Name | 1 |
| 250 | 205 | 15 | Phone Number | 1 |

Note that in this example, the Field_Type_ID of 1 indicates that these are text fields.

Add New Data Record

This example demonstrates the database 160 changes that occur when a user adds a new data record to the system 102. Assume that a user wishes to add a new data record to their account of type "Friend" as was defined in the previous example, with the following values:

First Name: Tom
Last Name: Smith
Phone Number: 555-1212

Assuming that the user's account ID is 250, the last VOB_ID used for the account was 500, the last Field_ID used for the account was 1250 and the user wishes to name this record "Tom Smith", this operation creates the following row in the VOB_Data table:

TABLE 7

| Account_ID | VOB_ID | VOB_Type_ID | VOB_Label |
|---|---|---|---|
| 250 | 505 | 205 | Tom Smith |

It also creates the following rows in the VOB_Field_Data table:

TABLE 8

| Account_ID | Field_ID | VOB_ID | Field_Order | Field_Value |
|---|---|---|---|---|
| 250 | 1255 | 505 | 5 | Tom |
| 250 | 1260 | 505 | 10 | Smith |
| 250 | 1265 | 505 | 15 | 555-1212 |

In at least one embodiment, the primary database 160 tables with which the VRM 154 interacts to provide the capabilities described above are presented. Presentation of these exemplary tables is not intended to limit practice of the invention to use of only these tables or the specific data table structure presented, for those skilled in the art will recognize that a different data and table architecture may be implemented and still fall within the scope of the invention.

The VOB table structure for an exemplary embodiment is as follows:

TABLE 9

| VOB Table Column | Type | Primary Key | Description |
|---|---|---|---|
| Account_ID | Number | Yes | Unique ID that identifies the user account for which the VOB type is defined. |
| VOB_Type_ID | Number | Yes | Unique ID in the scope of Account_ID for this VOB type. |
| VOB_Name | Text | No | Name of the VOB type. |
| VOB_Description | Text | No | A description of the VOB type. |
| XML_Tag_Name | Text | No | A name to use for this type when translating to an XML representation. |

The VOB_Field table structure for an exemplary embodiment is as follows:

TABLE 10

| VOB_Field Column | Type | Primary Key | Description |
|---|---|---|---|
| Account_ID | Number | Yes | Unique ID that identifies the user account for which the VOB type is defined. |
| VOB_Type_ID | Number | Yes | ID of the VOB Type of which this field is a member. |
| Field_Order | Number | Yes | Specifies the relative order of this field within the VOB Type. |
| Field_Label | Text | No | Name of this field. |
| Field_Type_ID | Number | No | ID representing the Type of field (text, date, CC Type, Country, etc.). |
| Field_Default_Value | Text | No | Default value for the field. |
| XML_Tag_Name | Text | No | A name to use for this field when translating to an XML representation. |

The VOB Data table structure for an exemplary embodiment is as follows:

TABLE 11

| VOB_Data Table Column | Type | Primary Key | Description |
|---|---|---|---|
| Account_ID | Number | Yes | Unique ID that identifies the user account for which the VOB instance is defined. |
| VOB_ID | Number | Yes | Unique ID in the scope of Account_ID for this VOB instance. |
| VOB_Type_ID | Number | No | ID of the VOB Type of this VOB instance. |
| VOB_Label | Text | No | Label to use for this VOB instance (for User Interface display purposes). |
| Category_ID | Number | No | Category under which this VOB is organized. |
| VOB_Order | Number | No | Order of this VOB within the specified category. |
| Show_VOB | Number | No | Allows the fields within this VOB to be displayed or not. 0 = VOB fields are hidden, 1 = VOB fields are shown. |
| Public_VOB_ID | Text | No | VOB ID that is used by the B2B interface 119. |

The VOB_Field_Data table structure for an exemplary embodiment is as follows:

TABLE 12

| VOB_Field_Data Column | Type | Primary Key | Description |
|---|---|---|---|
| Account_ID | Number | Yes | Unique ID that identifies the user account for which the VOB instance is defined. |
| Field_ID | Number | Yes | Unique ID of this field record in the scope of Account_ID. |
| VOB_ID | Number | No | ID of the VOB that is the owner of this field. See VOB_Data::VOB_ID. |
| Field_Order | Number | No | Order of this field within the parent VOB. See VOB_Field::Field_Order. |
| Field_Value | Text | No | Value of the field. |
| Field_Mod | Date/Time | No | Last time the field value was modified. |
| Encryption | Number | No | Indicates the type of encryption applied to the field. |
| Public_Field_ID | Text | No | Field ID that may be used via the B2B interface 119 to reference this field. |

The Field_Group table structure for an exemplary embodiment utilizing the InfoCard feature is as follows:

TABLE 13

| Field_Group Column | Type | Primary Key | Description |
|---|---|---|---|
| Account_ID | Number | Yes | Unique ID that identifies the user account for which the InfoCard is defined. |
| Group_ID | Number | Yes | Unique ID of this InfoCard in the scope of Account_ID. |
| Group_Name | Text | No | Name of this InfoCard. |
| Required | Number | No | 1 = this InfoCard is defined by the system and cannot be removed. |
| Read_Only | Number | No | 1 = You cannot edit the InfoCard. 0 = You can edit the InfoCard. |
| Hidden | Number | No | 1 = this group cannot be edited or seen. |

The Field_Group_Data table structure for an exemplary embodiment utilizing the InfoCard feature is as follows:

TABLE 14

| Field_Group_Data Column | Type | Primary Key | Description |
|---|---|---|---|
| Account_ID | Number | Yes | Unique Id that identifies the user account for which the InfoCard is defined. |
| Group_ID | Number | Yes | ID of the InfoCard to which this field belongs. |
| Field_ID | Number | Yes | Field_ID of the field to include in the InfoCard. |

The VRecord table structure for an exemplary embodiment is as follows:

TABLE 15

| VRecord Column | Type | Primary Key | Description |
|---|---|---|---|
| Account_ID | Number | Yes | Unique Id that identifies the user account for which the VRecord is defined. |
| VRecord_ID | Number | Yes | Unique ID in the scope of Account_ID for this VRecord. |
| VRecord_Name | Text | No | Name of the VRecord. |
| Label | Text | No | Printable name for the VRecord. |

The VRecord_Dynamic_Data table structure for an exemplary embodiment is as follows:

TABLE 16

| VRecord_Dynamic_ Data Column | Type | Primary Key | Description |
|---|---|---|---|
| Account_ID | Number | Yes | Unique ID that identifies the user account for which the VRecord is defined. |
| VRecord_ID | Number | Yes | ID of the VRecord to which this field belongs. See VRecord::VRecord_ID. |
| Account_Type_ID | Number | Yes | Indicates the user class that this mapping record applies to (e.g. business or individual account). |
| Field_Order | Number | Yes | Order within the VRecord that this field should be mapped. |
| Field_ID | Number | No | Field_ID of the field to include in the Vrecord. |
| Label | Text | No | Printable name of the field within the Vrecord. |

The VRecord_Static_Data table structure for an exemplary embodiment is as follows:

TABLE 17

| VRecord_Static_ Data Column | Type | Primary Key | Description |
|---|---|---|---|
| Account_ID | Number | Yes | Unique ID that identifies the user account for which the VRecord is defined. |
| VRecord_ID | Number | Yes | ID of the VRecord that this field belongs. See VRecord::VRecord_ID. |
| Column_Name | Text | Yes | Name of the column in Contact table to use for the field. |
| Column_Order | Number | No | Order of the column within the Vrecord. |
| Label | Text | No | Printable name for the field. |

The data exchange engine (DXE) 156 supports the exchange of information between users of the system 102. The DXE 156 provides interfaces to enable users to request information from each other, approve or deny requests for information, and provide authorized information. The DXE 156 also supports the definition and enforcement of rule-based behaviors on the availability of information, sharing of information in a global space (public directory), sharing of simple text messages, and event triggers based on requests and changes to authorized information.

In requesting information from another system 102 user, registered users may request either globally defined Info-Cards (see the description of InfoCards above) of information, or globally defined fields of information from the other user. The DXE 156 provides event notification hooks for requests for information and messages. Users may approve or deny the request by InfoCard or field, and apply rules regarding access to any provided information, e.g., specifying an expiration date for access to the information. Furthermore, users may also provide any field or InfoCard to another user at any time.

The DXE 156 further provides interfaces for registered users to view information made available to them from other registered users. It is noted that when a user changes a field that has been shared, the changed information is available to other users immediately. This functionality is operative due to the DXE 156 architecture, which provides event notification hooks for changes to information that is available to other users.

The DXE 156 is operative to track relationships between users in a Data_Sharing table. Each record represents what is shared from user A to user B. A record exists only if user A is sharing one or fields with user B. In addition, if user B shares information with user A, an additional record appears in the Data_Sharing table. It is in this table that any rules regarding the sharing of information between the two users is defined.

As previously described, users can share information either by specifying individual fields of information, or by using the InfoCards feature. This sharing information is tracked by the DXE 156 in the Data_Sharing_Field_ID and Data_Sharing_Group_ID tables (shown below), respectively. The DXE 156 architecture explicitly normalizes this data in the database 160 to enable the capability to perform reverse lookups of shared information, e.g., finding all users that you are sharing your home phone number with. It is noted that there is one InfoCard that the DXE 156 treats specially, the Directory InfoCard. The Directory InfoCard is given the same ID for all users (which uniquely identifies it as the Directory InfoCard) and has the behavior attribute that all fields defined within this Infocard are implicitly shared with all other users. For example, when an application in the application layer 140 requests the information being shared by user A with user B, the system 102 returns all of the fields explicitly shared by A with B, and all the fields that A has placed in his/her Directory InfoCard.

In at least one embodiment, the primary database 160 tables with which the DXE 156 interacts to provide the capabilities described above are presented. Presentation of these exemplary tables is not intended to limit practice of the invention to utilization of only these tables or the specific data table structure presented, for those skilled in the art will recognize that a different data and table architecture may be implemented and still fall within the scope of the invention.

The Data_Sharing table structure for an exemplary embodiment is as follows:

TABLE 18

| Column | Type | Primary Key | Description |
| --- | --- | --- | --- |
| Account_ID | Number | Yes | Unique identifier for the user account that is sharing information. |
| Recipient_Account_ID | Number | Yes | Unique identifier for the user that is receiving the information. |
| Sharing_Record_ID | Number | Yes | Unique identifier for this record. |
| Expiration_Date | Date/Time | No | Access to information expires on this date. |
| Date_Granted | Date/Time | No | Access to information was originally granted on this date. |
| Date_Modified | Date/Time | No | Access to information was last modified on this date. |

The Data_Sharing_Field_ID table structure for an exemplary embodiment is as follows:

TABLE 19

| Column | Type | Primary Key | Description |
| --- | --- | --- | --- |
| Account_ID | Number | Yes | Unique identifier for the user account that is sharing information. |
| Recipient_Account_ID | Number | Yes | Unique identifier for the user that is receiving the information. |
| Field_ID | Number | Yes | ID of the field that is being shared. See VOB_Field_Data::Field_ID. |

The Data_Sharing_Group_ID table structure for an exemplary embodiment is as follows:

TABLE 20

| Column | Type | Primary Key | Description |
| --- | --- | --- | --- |
| Account_ID | Number | Yes | Unique identifier for the user account that is sharing information. |
| Recipient_Account_ID | Number | Yes | Unique identifier for the user that is receiving the information. |
| Group_ID | Number | Yes | ID of the InfoCard that is being shared. See Field_Group::Group_ID. |

The encryption engine 158 provides to the VRM 154 and the DXE 156 the capability to save and access raw data that has been encrypted in the relational database 160. This feature is critical to ensuring the security of data that is saved by the system 102, for unencrypted data in a database is very vulnerable to attack, even within what is considered a secure network.

All data read and write requests to the database 160 are implemented through the encryption engine 158, making the task of encrypting and decrypting transparent to all other layers of the system 102 architecture. The encryption engine 158 supports a plurality of conventional encryption schemes on a per field basis. For example, one field in a record may be encrypted using 128-bit symmetric encryption, while another field in the same record may be saved with no encryption at all. The encryption engine 158 architecture also allows encryption keys to be stored physically separate from the database 160 server hosting the encrypted data. Employment of this feature makes it even more difficult to covertly obtain raw information from the database 160.

The database 160 comprises data 162 (user personal information) encrypted by the encryption engine 158, metadata 164 as described above primarily in reference to the VRM 154, and permissions information 166 as described above primarily in reference to the DXE 156. As described above, the VRM 154 and the DXE 156 interact with the database 160 any time a user's personal information is created, edited, or accessed.

Attention is directed to the interface layer 130, preferably comprising the WAP (wireless application protocol) interface server 131, the web clipping interface server 133, the sync interface server 135, the web interface server 137, and the B2B interface server 139. The interface layer 130 is configured to manage the user interaction with the system 102. The different interface servers 131-139 communicate with various client side devices or software across a network 120, preferably a WAN such as the Internet, and manage the user interaction with the system 102 utilizing the communication protocol that is appropriate for the client side device or client side software. The interface servers 131-139 invoke various internal components of the system 102, namely the account manager 152, the vault 142 and the DXE 156, to retrieve, edit, and store information.

The WAP interface server 131 is focused on interfacing with WAP devices 111 utilizing the wireless application protocol, such as Internet-enabled mobile phones or similar wireless communication devices. The web clipping interface server 133 is focused on interfacing with wireless handheld electronic devices 113, such as personal digital assistants (PDAs), communicating over a wireless medium utilizing the web clipping protocol. The web interface server 137 is focused on interfacing with users accessing the system 102 via a conventional web browser 117. The web interface server 137 preferably utilizes the secure hypertext transfer protocol (https).

The contact manager 148 manages the list of contacts of a user as described above. The sync interface server 135 provides the interface for synchronizing the contact information stored in the system 102 with other conventional client address books resident on various user handheld or desktop devices. The sync interface server 135 is configured to communicate with client synchronization software 115 residing on the various user handheld or desktop devices, via the network 102.

Finally, the B2B interface server 139 provides an application programming interface (API) for registered users to login to the system 102 and to query for their information or for information about their contacts. Additional exemplary operations include changing (add/delete/edit) their personal information, sharing their personal information with others, requesting others to share their information, and all the other functionality offered by the vault 142 and the contact manager 148 applications. The B2B interface server 139 communicates with client users utilizing https. Upon a client transmission of a request to do a certain action (e.g., manipulate information data 162 or permissions data 166), the request is made to the system 102 using the POST command of http and, possibly, described using XML (eXtended Markup Language). The B2B interface server 139 processes the request and invokes the account manager 152, the vault 142, and the contact manager 148 to perform appropriate subtasks within the request. These three subsystems return information or completion status to the B2B interface server 139, which then appropriately replies to the client request using the language of XML. Through this XML request-reply mechanism, the user can exercise all the functionality of the system 102 described above.

The B2B interface client 119 depicts any software that can communicate over the https protocol and send requests and receive replies from the B2B interface server 139. The B2B interface client 119 application is intended to be written by users of the system 102, with the goal of integrating the information exchange service provided by the system 102 with other user databases containing personal or business information. For example, if a user of the system 102 maintains a list of customers and their contact information in an enterprise database, this user can write a B2B interface client 119 application to interface with the B2B interface server 139, and thus the system 102. Through communication between the proprietary B2B interface client 119 and the B2B interface server 139, the user can access contact information about his customers from the system 102 and store this contact information in the local enterprise database. This feature enables the user's customer information stored on the enterprise database to maintain synchronization with the information in the system 102.

In addition to the API provided for businesses to link to the system 102, a business model is contemplated that would utilize the system 102 to provide a myriad of information services to businesses for a fee. The services provided by the system 102 assist the business in minimizing their database maintenance costs, reducing customer service/call center costs, and improving sales and marketing activities. Some exemplary services may include, but are not limited to, the following: (1) providing accurate, timely customer record updates, thus increasing the efficiency of marketing programs; (2) reducing customer service costs through minimization of call length by facilitating the identification of callers through their system 102 ID, thus providing instant access to the information necessary to resolve the customer complaint/inquiry; (3) maintaining company employee and vendor information through the system 102, either in a distributed manner as described above in reference to the contact manager 148 or through an independent system 102 licensed to the company; (4) listing company information in a business directory maintained by the system 102, which could be used in lieu of or to augment conventional directories such as the white and yellow pages; (5) simplifying customer electronic purchases by enabling customers to register with their site and perform transactions utilizing their system 102 ID and associated information, thus increasing the volume of completed transactions; (6) displaying privacy policies to customers and matching those policies with privacy preferences of the customer maintained by the system 102; (7) maintaining a digital certificate registry to search and track digital certificates of users so that the certificate authority can be automatically notified when a user changes relevant information; and (8) providing a data escrow service thereby escrowing credit card and other transaction information for on-line auction participants.

It will be recognized by those skilled in the art that while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications and that its scope is limited only by the claims appended hereto.

What is claimed is:

1. A computerized method for exchanging information over a network, the method comprising:
    facilitating communication with a user through the network;
    managing storage of information of the user in a data repository in a manner such that a type of information is instantiated substantially instantaneous;
    providing storage of permissions information describing parties allowed access to at least a portion of the information; and
    wherein the at least a portion of the information is shared for a defined period of time.

2. The method of claim 1 further comprising providing the user with a summary of information for a plurality of contacts that have changed.

3. The method of claim 1 further comprising providing an alert or notification to at least one of the parties allowed access whenever the information has been updated.

4. The method of claim 1 further comprising determining a party who has actually viewed the information.

5. The method of claim 1 the information includes personal information.

6. The method of claim 1 wherein one of the parties allowed access is a friend, a relative or a business.

7. The method of claim 6 further comprising:
    dynamically sharing information of the friend, relative or business with the user; and
    wherein if the friend, relative or business modifies a portion of the information of the friend, relative or business, then enabling the user to view the newly modified portion of the information of the friend, relative or business.

8. The method of claim 1 further comprising enabling the user to approve or deny a request for the information.

9. The method of claim 1 further comprising providing authorized information.

10. The method of claim 1 further comprising providing an event trigger to the user upon a request or a change to authorized information.

11. The method of claim 1 wherein the information includes a text message.

12. The method of claim 1 further comprising tracking relationships between the user and at least one other party.

13. A computerized method for exchanging information over a network, the method comprising:
    facilitating communication with a user through the network;
    managing storage of information of the user in a data repository in a manner such that a type of information is instantiated substantially instantaneous;
    providing storage of permissions information describing parties allowed access to at least a portion of the information;
    associating an object type with the information;
    creating a row in a first data table to store object metadata related to the object type, the object type metadata describing the quality of data fields constituent to the information record;

creating a second data table, each row in the second data table representing at least one of the data fields constituent to the information record;

providing field metadata associated with the at least one data field to a virtual record manager, the field metadata describing the information in the at least one data field; and providing real-time instantiation of the information record in the data repository based on the first and second data tables and the object type and field metadata.

* * * * *